United States Patent [19]

Schwelm

[11] Patent Number: 5,178,358

[45] Date of Patent: Jan. 12, 1993

[54] ADJUSTABLE PROPORTIONAL THROTTLE-VALVE WITH FEEDBACK

[75] Inventor: Hans Schwelm, Luxembourg-Dommeldange, Luxembourg

[73] Assignee: Hydrolux S.a.r.l., Luxembourg, Luxembourg

[21] Appl. No.: 781,384

[22] Filed: Oct. 23, 1991

[30] Foreign Application Priority Data

Oct. 31, 1990 [LU] Luxembourg ............... 87 831

[51] Int. Cl.⁵ .......................................... F16K 31/363
[52] U.S. Cl. .................................. 251/29; 251/30.03; 251/38; 251/44
[58] Field of Search ................... 251/29, 30.03, 38, 44

[56] References Cited

U.S. PATENT DOCUMENTS

| | | | |
|---|---|---|---|
| 2,805,038 | 9/1957 | Towler et al. | 251/29 X |
| 4,662,600 | 5/1987 | Schwelm | 251/30.03 |
| 4,724,864 | 2/1988 | Schwelm | 137/486 |

FOREIGN PATENT DOCUMENTS

| | | | |
|---|---|---|---|
| 3234987 | 4/1983 | Fed. Rep. of Germany | 251/29 |
| 2031616 | 4/1980 | United Kingdom | 251/38 |

Primary Examiner—Gerald A. Michalsky
Attorney, Agent, or Firm—Mason, Fenwick & Lawrence

[57] ABSTRACT

The throttle-part of the valve comprises a two-way seat valve with a follow-up throttle valve (8), which is driven by a differential guide piston (12) and an edge control system (20). The guide piston is pressurized via a pressure-spring (16) in a pressure-spring compartment in the direction of the closed position of the edge control system. The drive is effected via a pilot line A which pressurizes or depressurizes the pressure-spring compartment (18) via a proportional directional control valve (6), while the position of the guide piston (12) is determined by an inductive displacement transducer.

2 Claims, 1 Drawing Sheet

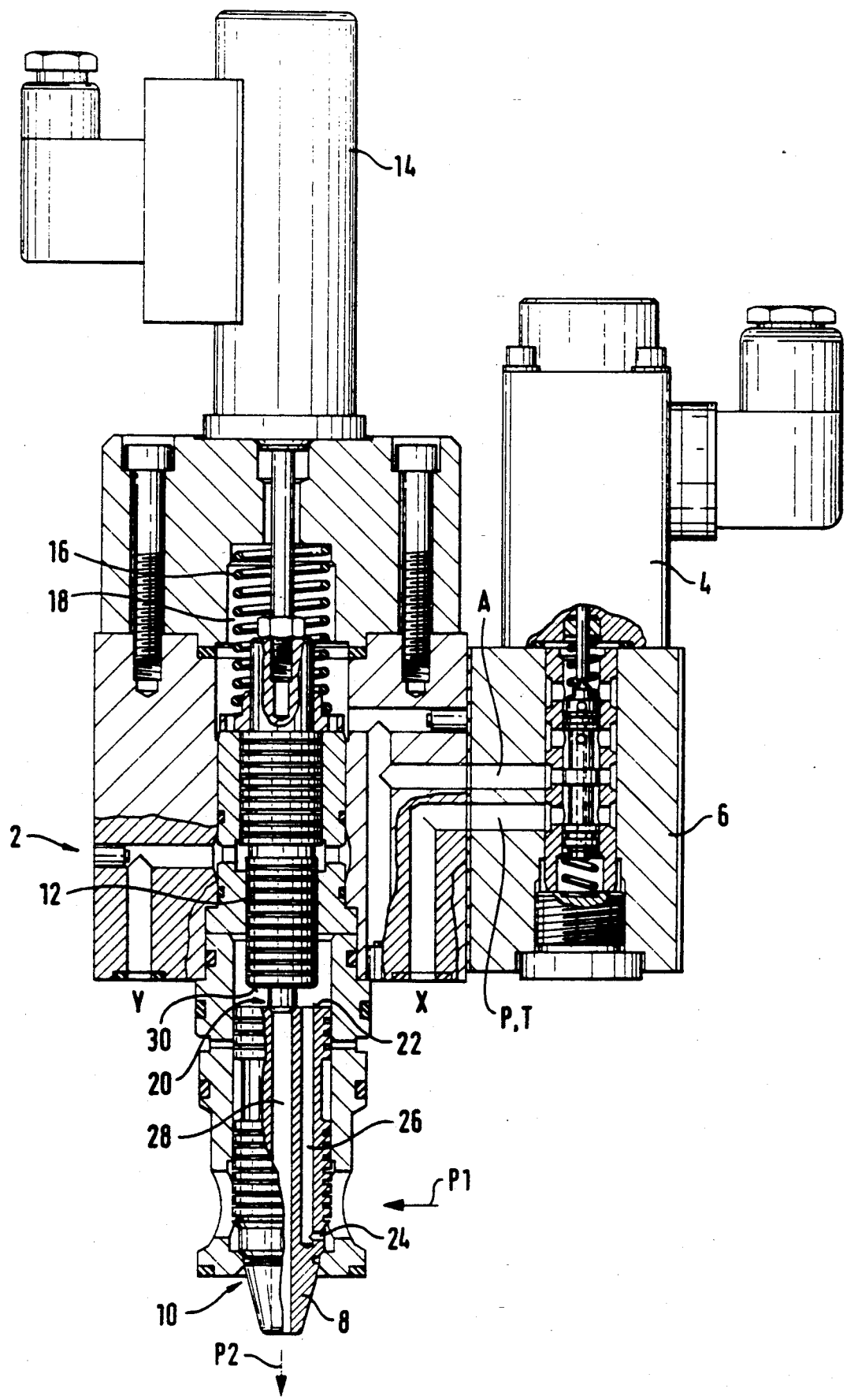

ADJUSTABLE PROPORTIONAL THROTTLE-VALVE WITH FEEDBACK

BACKGROUND OF THE INVENTION

The invention relates to an adjustable throttle valve, comprising a one-piece or multi-piece housing, and having a control part and a throttle part, the throttle part containing a valve comprising an axially movable, hydraulically actuated follow-up throttle piston which, on the one side, links a supply channel via an annular restrictor to a service channel, the annular restrictor being formed between a bearing surface of the follow-up throttle piston and a corresponding seat of the housing and being open to a greater or lesser extent according to the axial position of the follow-up throttle piston, and which, on the opposite side, exhibits a hydraulically pressurised pressure shoulder which is linked, by an inlet channel with restrictor, to the supply channel and, by an outlet channel, to the service channel, the outlet channel exhibiting an aperture, which can be regulated via the control part, for regulating the pressure acting upon the pressure shoulder, which pressure determines the movement and position of the follow-up throttle piston.

Adjustable proportional throttle valves with feedback are commonly known and find application in all hydraulic assemblies. Amongst the many applications, there are various, e.g. hydraulic presses and large cranes, with which, despite the size of the plant and the magnitude of the hydraulic operating pressure, very precise movements have to be carried out and accordingly high demands are placed upon the precision and accuracy of the mode of operation of the throttle valves.

The known throttle valves according to a prior art, however only accomplished these requirements partially or inadequately. Firstly, these throttle valves required excessive regulating forces in the control part, which is disadvantageous from the economic viewpoint. Secondly, the known throttle valves possessed over-long switching times for the various applications, which put their use into question. Moreover, these known throttle valves were subjected to high wear and tear, so that their working life was too short.

In Document LU-84377 corresponding to U.S. Pat. No. 4,662,600, a descriptron is thus given of an adjustable proportional throttle valve, with which the costly pilot control system with power feedback is slim intend and the structural size can be reduced, whilst still maintaining the advantages offered in principle by these valves.

The principal concept of the invention described in that document consisted in making use of the oil pressure of the actual work system as a servo-energy supplier for the actuation of those valve components which, through the throttle valve, determine the volume flow, thereby, in addition to other benefits, substantially relieving the control part. This was able to be realised by virtue of a follow-up throttle piston arrangement.

For the characteristics of the mode of operation of the valve presented in the cited document, reference is made to this document.

The object of the present invention is to improve this last-mentioned valve by quite substantially reducing the valve-switching times and decisively improving the repetitive accuracy.

SUMMARY OF THE INVENTION

This object is achieved, starting from a valve of the type mentioned in the preamble, which is characterised by a differential guide piston which is in alignment with the outlet channel of the follow-up throttle piston and forms, with the valve seat of this outlet channel, an edge control system of seat construction type which is known per se, an inductive displacement transducer for determining the position of the guide piston and a proportional-magnet controlled proportional directional control valve which, by virtue of a single-edge control system, pressurizes or depressurises a pilot line, these components together forming a closed-loop control circuit, a pressure spring within a spring chamber, which acts upon the guide piston in the direction of the closed position of the said edge control system, and a pilot passage between the said proportional directional control valve and the said spring chamber which positions the differential guide-valve, through pressurisation or depressurisation, against the resulting force of an input pressure on the surface of the pressure shoulder of the differential guide piston and hence also, through the effect of an input-side or load-side oil pressure of the work system, i.e., operated devices, positions the follow-up throttle piston, the throttle opening of the throttle valve being determined, independently of the input pressure and load pressure, purely as a function of the input signal to the proportional magnet.

As a result of a special stepped construction of the differential guide piston, the surface pressure on the valve seat bearing surface is greatly reduced without, however, impairing the sealing function. The proportional throttle valve is particularly characterised by high speeds, i.e. short switching times, associated with low control-oil volumes and low control pressure.

BRIEF DESCRIPTION OF THE DRAWING

The figure is a partial cross-sectional view of the throttle-valve of the invention.

DESCRIPTION OF THE PREFERRED EMBODIMENT

The figure shows a longitudinal section through the essential parts of the valve 2. Its function-relevant components are a proportional magnet 4 for the actuation of a proportional directional control valve 6 of the slide construction type, a follow-up throttle piston 8 for the control of the through-flow section 10 between a system input side pl and a system load-side p2, these sides also, as described in Document LU-84 377 corresponding to U.S. Pat. No. 4,662,600, being interchangeable, a differential guide piston or stepped piston 12, an inductive displacement transducer 14 for this guide piston 12, a pressure spring 16 within a sealed pressure-spring chamber 18, which acts upon the differential guide piston 12 in the direction of the follow up throttle piston 8, a pilot passage A between the proportional directional control valve 6 and the pressure-spring chamber 18, through which passage the oil pressure in the latter can be regulated, and an edge control system of seat construction type 20, here shown with conical bearing surfaces, between the differential guide piston 12 and the follow-up throttle piston 8.

The interaction of piston 8 and edge control system 20 is described in detail in the above mentioned patent, the back surface 22 of the follow-up throttle piston 8 being continually pressurised, via a restricting opening 24 and a longitudinal channel 26, at the input pressure p1 and being connected, upon opening of the edge control system 20, via a central outlet channel 28, to the load side p2.

In contrast to the valve of the type mentioned in the preamble, i.e. that described in the cited patent, the edge control system 20, in the case of the valve according to the invention, is not opened as a result of components corresponding to the differential guide piston 12 being raised from the seat of the edge control system 20 by a pressure exerted by a proportional directional control valve 6, i.e. as a result of the control-side pressure, but instead by the system input pressure p1 on a pressure shoulder 30 on the guide piston 12. The opening of the edge control system 20 is now effected by the spring chamber 18 being selectively depressurised via the work line A, and its closing is effected, by the spring chamber 18 being selectively pressurised through the pilot passage A.

Very thorough studies and experiments have confirmed that, as a result of the improvement according to the invention to the valve of the type mentioned in the preamble, the sought-after targets have been fully achieved, namely switching times which are up to ten times shorter and the repetitive accuracy possible as a result of the said closed-loop control circuit. A very desirable side-effect is obtained, namely that, as a result of the pressure on the pressure shoulder 30, the surface compression on the bearing surfaces of the edge control system 20 is decisively reduced, without however impairing the sealing function thereof.

The claims and specification describe the invention presented, and the terms that are employed in the claims draw their meaning from the use of su h terms int eh specification. Some terms employed in the prior art may be broader in meaning than specifically employed herein. Whenever there is a question between the broader definition of such term as used in the prior art and the more specific use of the term herein, the more specific meaning is meant.

I claim:

1. An adjustable proportional throttle valve comprising:

a housing having a fluid inlet and a fluid outlet, means in said housing for throttling flow of fluid through said fluid outlet comprising a seat in said housing and an axially movable throttle piston having a throttling end adjacent said seat, said throttle piston comprising a surface thereon opposite said throttling end, a control chamber for receiving fluid pressure having said surface therein, an inlet channel in said throttle piston extending through said surface and in fluid communication with said control chamber, a restrictive opening in said throttle piston connecting said fluid inlet with said inlet channel, an outlet in the throttling end of said throttle piston and an outlet channel extending through said throttle piston from said surface to said outlet therein, said throttle piston having a valve seat at said surface thereof at the entrance of said outlet channel, a stepped guide-piston displaceable in said housing in alignment and with said throttle piston, said guide piston having a first end in said control chamber, a spring chamber in said housing remote from said control chamber, said guide piston having a second end located in said spring chamber, a spring in said spring chamber engaging said guide piston for urging said guide-piston towards said throttle piston, said stepped guide-piston supporting in said control chamber a follow-up piston extending from and having a smaller diameter than said first end of said stepped guide piston, a pressure shoulder on said first end of said stepped guide piston surrounding said follow-up piston, said follow-up piston having a free end engageable with said valve seat at said surface of said throttle piston, a closed control loop having an inductive displacement transducer connected to said guide piston, a proportional directional control valve having an inlet for connection to a source of pressure, an outlet, and means comprising a proportional magnet door controlling the flow of pressure fluid therethrough, and a pilot passage connecting the outlet of said proportional directional control vale with said spring chamber, whereby said proportional directional control valve is controlled by said proportional magnet to control the flow of pressure fluid through said pilot passage and to determine the pressure in said spring chamber in opposition to the pressure in said control chamber acting on said pressure shoulder of said differential guide-piston, whereby the position of the stepped guide-piston and the follow-up piston is determined, and whereby the position of the throttle piston and the passage between said throttling end of said throttle piston and said seat in said housing is determined independently of the input pressure and of pressure downstream of said throttling means and said outlet of said throttle piston, as a function of the input signal of the proportional magnet.

2. The adjustable proportional throttle valve according to claim 1, wherein the diameter of said first end of said guide piston is smaller than the diameter of said second end of said guide piston.

* * * * *

UNITED STATES PATENT AND TRADEMARK OFFICE
CERTIFICATE OF CORRECTION

PATENT NO. : 5,178,358

DATED : January 12, 1993

INVENTOR(S) : HANS SCHWELM

It is certified that error appears in the above-identified patent and that said Letters Patent is hereby corrected as shown below:

Column 4, line 14, delete "and"

Signed and Sealed this

Nineteenth Day of October, 1993

*Attest:*

BRUCE LEHMAN

*Attesting Officer*     *Commissioner of Patents and Trademarks*